(12) United States Patent
Fetterman et al.

(10) Patent No.: US 7,412,021 B2
(45) Date of Patent: Aug. 12, 2008

(54) ADVANCED GRAY ROD CONTROL ASSEMBLY

(75) Inventors: Robert J. Fetterman, Murrysville, PA (US); James A. Sparrow, Irmo, SC (US)

(73) Assignee: Westinghouse Electric Co LLC, Pittsburgh, PA (US)

( * ) Notice: Subject to any disclaimer, the term of this patent is extended or adjusted under 35 U.S.C. 154(b) by 113 days.

(21) Appl. No.: 11/189,472

(22) Filed: Jul. 26, 2005

(65) Prior Publication Data

US 2007/0036260 A1 Feb. 15, 2007

(51) Int. Cl.
*G21C 7/00* (2006.01)

(52) U.S. Cl. .................. 376/327; 376/333; 376/339

(58) Field of Classification Search .............. 376/327, 376/333, 339
See application file for complete search history.

(56) References Cited

U.S. PATENT DOCUMENTS

| | | | | |
|---|---|---|---|---|
| 2,859,163 A | * | 11/1958 | Ploetz et al. ............ | 376/327 |
| 2,983,817 A | * | 5/1961 | Earley et al. ............ | 376/159 |
| 3,255,092 A | * | 6/1966 | Dee, Jr. .................. | 376/333 |
| 4,079,236 A | | 3/1978 | Graham et al. | |
| 4,172,760 A | * | 10/1979 | Ballard et al. ........... | 376/245 |
| 4,564,498 A | * | 1/1986 | Grossman et al. ........ | 376/245 |
| 4,626,404 A | * | 12/1986 | Chubb .................... | 376/447 |
| 4,687,620 A | | 8/1987 | Impink, Jr. | |
| 4,759,904 A | | 7/1988 | Gillett et al. | |
| 5,064,607 A | * | 11/1991 | Miller et al. ............. | 376/333 |
| 5,141,711 A | | 8/1992 | Gjertsen et al. | |
| 5,167,900 A | * | 12/1992 | Odaka et al. ............ | 264/512 |
| 5,872,826 A | * | 2/1999 | Fujieda et al. ........... | 376/447 |
| 6,246,740 B1 | * | 6/2001 | Maruyama et al. ....... | 376/327 |
| 6,275,556 B1 | * | 8/2001 | Kinney et al. ........... | 376/232 |
| 6,636,580 B2 | * | 10/2003 | Murakami et al. ....... | 376/333 |

* cited by examiner

*Primary Examiner*—Rick Palabrica

(57) ABSTRACT

An advanced gray rod control assembly (GRCA) is for a nuclear reactor. The reactor has a plurality of fuel assemblies each including numerous elongated fuel rods supported in an organized array by substantially transverse support grids, and a plurality of guide thimbles disposed through the support grids and along the fuel rods. The GRCA includes a spider assembly structured to provide controlled insertion of gray rod assemblies within the thimbles of the fuel assembly, thereby controlling the rate of power produced by the reactor. Each gray rod assembly includes an elongated tubular member, a first end plug, a second end plug, a substantially pure silver neutron-absorber disposed within the tubular member, and a support tube surrounding the neutron-absorber within the tubular member to resist silver-swelling. Delta-power of the reactor is improved by minimizing the exposed surface area of the absorber and distributing it among all of the rods of the GRCA.

19 Claims, 5 Drawing Sheets

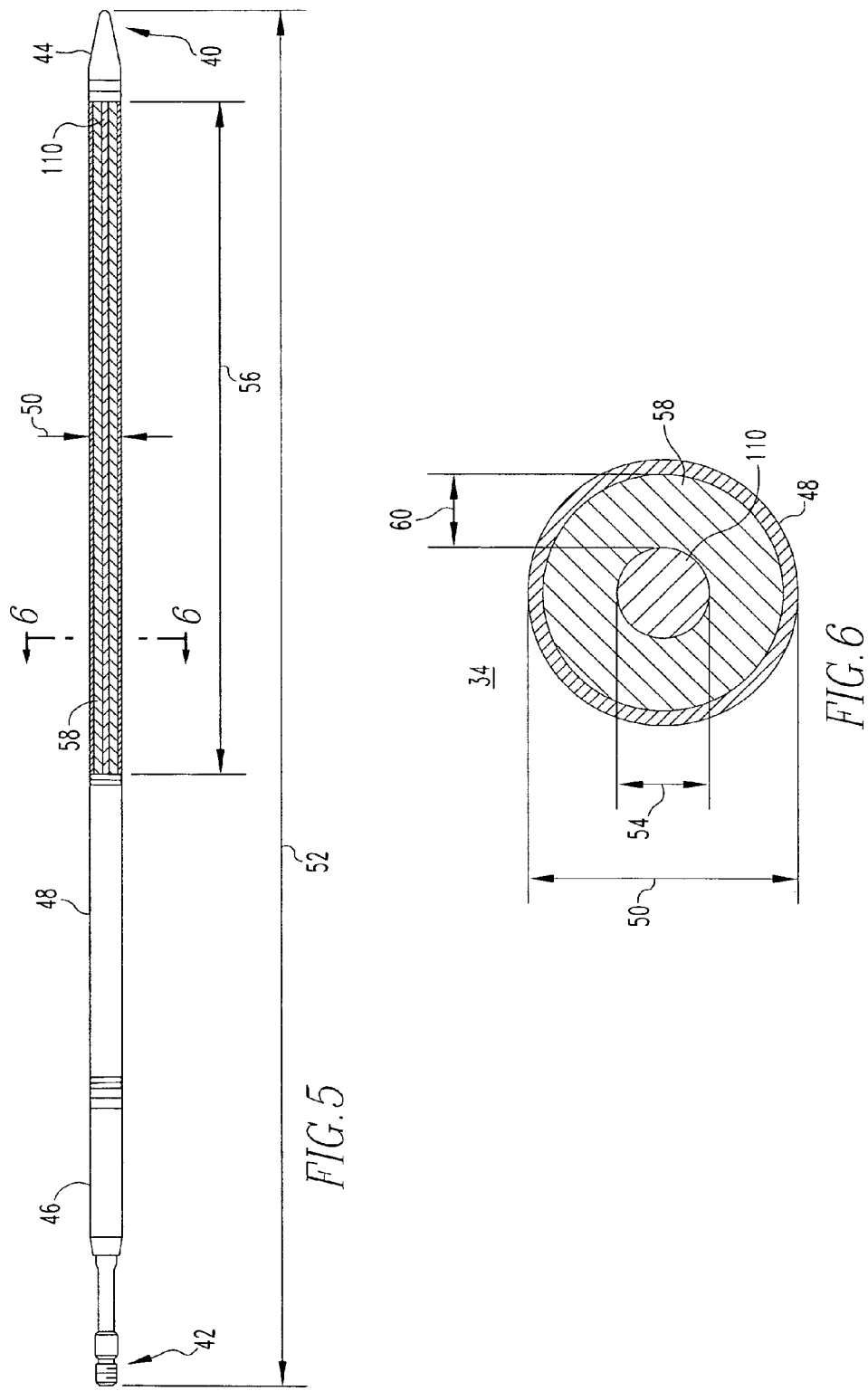

ADVANCED GRAY ROD CONTROL ASSEMBLY

BACKGROUND OF THE INVENTION

1. Field of the Invention

The present invention relates generally to nuclear reactors and, more particularly, to an advanced design of gray rod control assemblies (GRCAs).

2. Background Information

The power produced by the reactor of a nuclear power plant is generally controlled by raising or lowering control rod assemblies within the reactor core, and the change in reactor power output required in order to accommodate a change in the demand for electrical output from the electrical power plant is commonly referred to as load follow. As described, for example, in U.S. Pat. No. 4,079,236, load follow presents many operating issues. For instance, in a pressurized water reactor (PWR) during load follow, reactivity must be controlled and axial power distribution changes in the core in response to the power level change, must be addressed.

The fuel assemblies of modern reactor cores typically employ two types of rod control assemblies to control reactivity, rod cluster control assemblies (RCCAs) and gray rod control assemblies (GRCAs). Both consist of a plurality of neutron-absorbing rods fastened at their top ends to a common hub or spider assembly. The body of the rods generally comprises a stainless steel tube which encapsulates a neutron-absorbing material, such as a silver-indium-cadmium absorber material, and the rods are slid within tubular guide thimble tubes of the fuel assembly with a control drive mechanism near the top of the spider assembly operating to control the movement of the rods within the thimble tubes. In this manner, the controlled insertion and extraction of the rods generally controls the rate of reactor power produced.

Typically, GRCAs are used in load follow maneuvering because they comprise reduced worth control rods, commonly referred to in the art as "gray" rods. Gray rods are known to provide a mechanical shim (MSHIM) reactivity mechanism as opposed to a chemical shim, which requires changing the concentration of soluble boron in the reactor coolant. Thus, the use of gray rods minimizes the need for processing the primary reactor coolant on a daily basis and, therefore, greatly simplifies operations. More specifically, existing GRCA designs typically consist of 24 rodlets fastened at their top ends to the spider. Of the 24 rodlets within the cluster, only four rods are absorber rods, and the neutron-absorber material encapsulated within the absorber rods typically consists of about 85% silver, about 10% indium, and about 5% cadmium. Such a design poses several disadvantages.

Among the disadvantages of known GRCA designs, is the fact that indium and cadmium have relatively large neutron cross-sections, which result in their depletion over a relatively short period of time. As a result, the rod worth of such GRCA design is reduced to about 80% of its initial value within about five years, or three 18-month fuel cycles, and continued decrease in the rod worth results in the GRCAs becoming ineffective in controlling the reactor during load follow. This undesirably leads to frequent GRCA replacement. A second disadvantage relates to changes in the local rod power for fuel rods which are adjacent to the four guide thimbles that contain the absorber rods. Specifically, because the absorber material is localized to four rodlets, a rapid change in power, commonly referred to as the delta-power of the fuel rods, occurs, for example, during a rod pull. A rod pull is the process of extracting the GRCA from the fuel assembly, and in known GRCA designs it results in a delta-power spike. Specifically, with the relatively large amount of absorber material confined to only four rods, a significant amount of heat is generated within those rods during such conditions (e.g., rod pull) of high local power density. This can cause bulk boiling, silver-swelling, and related disadvantages. Silver-swelling, which has been a longstanding problem in the industry for many years, frequently occurs because, although silver depletes slower than cadmium and indium, it also has the highest fluence, or absorption, of the three absorber materials, thus making it most susceptible to excessive heating and swelling. Too much swelling of the absorber can result in the absorber contacting and potentially cracking the cladding surrounding it.

There is, therefore, room for improvement in GRCAs for nuclear reactors.

SUMMARY OF THE INVENTION

These needs and others are satisfied by the present invention, which is directed to an advanced gray rod control assembly (GRCA) design that provides an improved neutron-absorber material, an improved gray rod assembly and a distribution of gray rod assemblies which is adapted to accommodate load follow operations and to overcome known adverse conditions traditionally associated therewith.

As one aspect of the invention, an improved gray rod assembly design is provided for the gray rods of a nuclear reactor. The nuclear reactor includes a number of fuel assemblies each having a plurality of elongated nuclear fuel rods supported in an organized array by a number of substantially transverse support grids, and a plurality of guide thimbles disposed through and affixed to the support grids and along the fuel rods. The rod control assembly includes a spider assembly having a plurality of radially extending flukes, and is structured to move each gray rod assembly within one of the guide thimbles in order to control the rate of power produced by the nuclear reactor. The gray rod assembly comprises: an elongated tubular member having a first end, a second end, an outer diameter, and a length; a first end plug coupled to the first end of the elongated tubular member, and being structured to facilitate insertion of the elongated tubular member into one of the guide thimbles of the fuel assembly; a second end plug coupled to the second end of the elongated tubular member, and being structured to be coupled to one of the radially extending flukes of the spider assembly of the rod control assembly; a neutron-absorber disposed within the elongated tubular member generally toward the first end thereof, the neutron absorber having a diameter which is substantially less than the diameter of the elongated tubular member, and a length which is shorter than the length of the elongated tubular member, in order to minimize the exposed surface area of the neutron-absorber to radiation when the tubular member is inserted into the thimble; and a support tube structured to surround the neutron-absorber within the elongated tubular member, the support tube being disposed between the neutron-absorber and the elongated tubular member, and being structured to resist swelling of the neutron-absorber.

The neutron-absorber may comprise substantially pure silver. The neutron-absorber may also be substantially concentrically disposed within the elongated tubular member, wherein the support tube has a wall thickness which is substantially defined by the space between the outer diameter of the absorber and the inner diameter of the elongated tubular member. The support tube may be made from stainless steel, and it may encapsulate the exemplary substantially pure silver absorber in order to resist silver-swelling thereof.

As another aspect of the invention, an advanced gray rod control assembly is provided for a nuclear reactor including a plurality of fuel assemblies each having a plurality of elongated nuclear fuel rods supported in an organized array by a number of substantially transverse support grids, and a plurality of guide thimbles disposed through and affixed to the support grids and along the fuel rods. The advanced gray rod control assembly comprises: a spider assembly having a plurality of radially extending flukes; and a plurality of gray rod assemblies coupled to the flukes of the spider assembly, the spider assembly being structured to move each gray rod assembly within one of the guide thimble in order to control the rate of power produced by the nuclear reactor, wherein each of the gray rod assemblies comprises: an elongated tubular member having a first end, a second end, an outer diameter, and a length, a first end plug coupled to the first end of the elongated tubular member, and being structured to facilitate insertion of the elongated tubular member into one of the guide thimbles of the fuel assembly, a second end plug coupled to the second end of the elongated tubular member, and being structured to be coupled to one of the radially extending flukes of the spider assembly, a neutron-absorber disposed within the elongated tubular member generally toward the first end thereof, the neutron absorber having a diameter which is substantially less than the diameter of the elongated tubular member, and a length which is substantially shorter than the length of the elongated tubular member, and a support tube surrounding the neutron-absorber within the elongated tubular member in order to resist swelling of the neutron-absorber and the cracking of the thimble when the rod assembly is inserted into the thimble.

The neutron-absorber may be distributed among all of the gray rod assemblies of the plurality of gray rod assemblies. More specifically, the advanced gray rod control assembly may include 24 gray rods wherein the neutron-absorber is distributed generally equally among all 24 gray rods of the assembly.

As yet another aspect of the invention, a fuel assembly for a nuclear reactor comprises: a plurality of elongated nuclear fuel rods each having an extended axial length; a number of substantially transverse support grids space along the axial length of the fuel rods in order to hold the fuel rods in an organized array; a plurality of guide thimbles disposed through the support grids and along the fuel rods; and an advanced gray rod control assembly including a spider assembly having a plurality of radially extending flukes, and a plurality of gray rods assemblies coupled to the flukes, the advanced gray rod control assembly being structured to move each of the gray rod assemblies within one of the guide thimbles in order to control the rate of power produced by the nuclear reactor, wherein each of the gray rod assemblies comprises: an elongated tubular member having a first end, a second end, an outer diameter, and a length, a first end plug coupled to the first end of the elongated tubular member, the first end plug being tapered in order to facilitate insertion of the elongated tubular member into one of the guide thimbles of the fuel assembly, a second end plug coupled at one end to the second end of the elongated tubular member, and at the other end to one of the radially extending flukes of the spider assembly, a neutron-absorber disposed within the elongated tubular member generally toward the first end thereof, the neutron absorber having a diameter which is substantially less than the diameter of the elongated tubular member, and a length which is substantially shorter than the length of the elongated tubular member, and, a support tube disposed between the neutron-absorber and the elongated tubular member thereby encapsulating the neutron-absorber within the tubular member, in order to resist swelling of the absorber.

BRIEF DESCRIPTION OF THE DRAWINGS

A full understanding of the invention can be gained from the following description of the preferred embodiments when read in conjunction with the accompanying drawings in which:

FIG. 5 is a partially sectioned elevational view of an advanced gray rod assembly in accordance with the invention;

FIG. 6 is a cross-sectional view taken along line 6-6 of FIG. 5;

DESCRIPTION OF THE PREFERRED EMBODIMENTS

Figure 1:
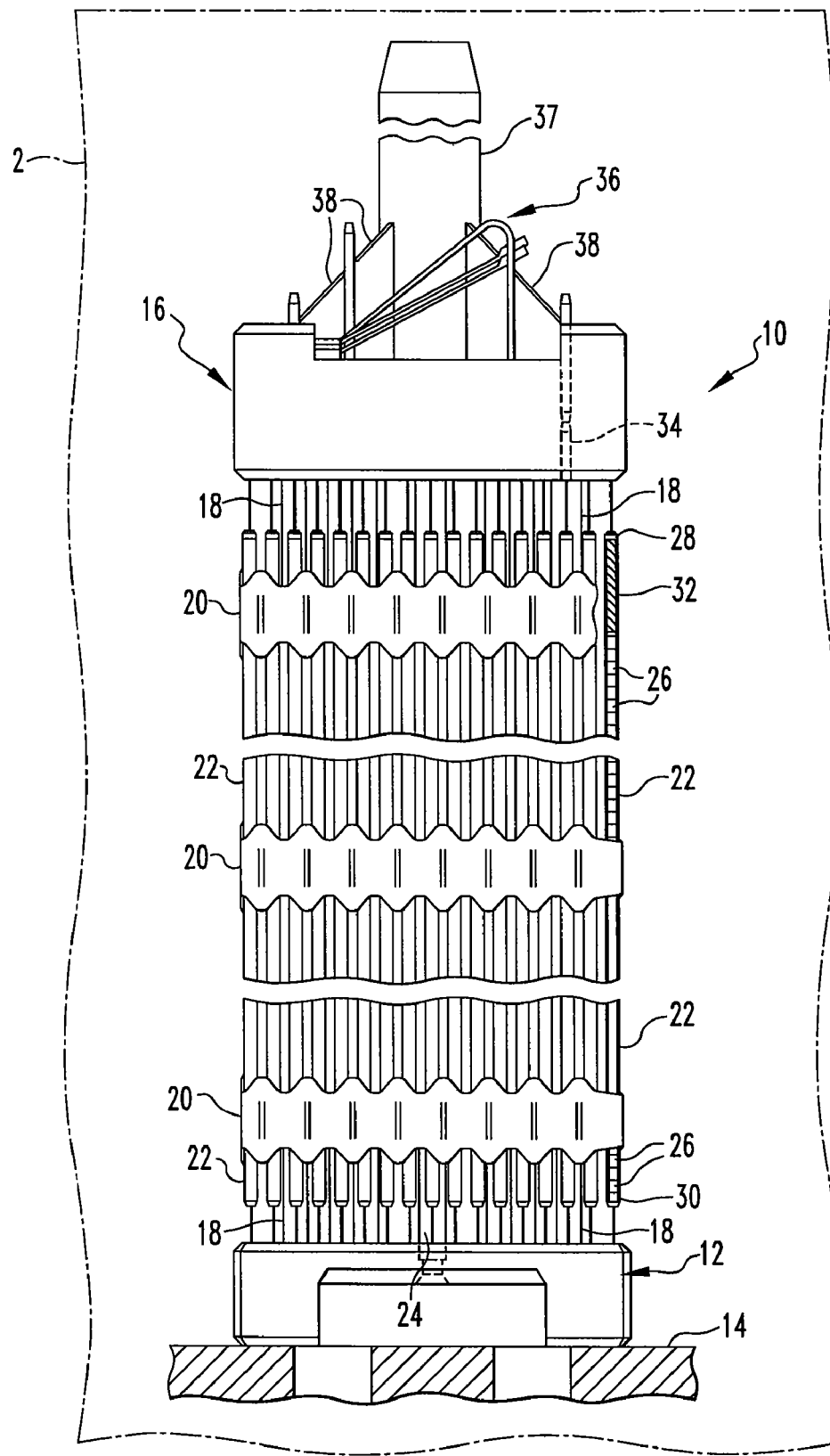
FIG. 1 is an elevational view of a fuel assembly, illustrated in vertically shortened form, and a control assembly therefor, partially shown in hidden line drawing.

For simplicity of disclosure, the invention will be described with reference to the pressurized water reactor (PWR) core design which is commercially known under the designation AP1000. The AP1000 is a Westinghouse Electric Company LLC reactor design. Westinghouse Electric Company LLC has a place of business in Monroeville, Pa. Reference to the AP1000 is provided for illustrative example purposes only and is not limiting upon the scope of the invention. It will, therefore, be appreciated that the exemplary GRCA design of the invention has application in a wide variety of other reactor designs.

Directional phrases used herein, such as, for example, upper, lower, top, bottom, left, right, and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "number" shall refer to one and more than one (i.e., a plurality).

Fuel Assembly

Referring now to the drawings and particularly to FIG. 1, there is shown an elevational view of a nuclear reactor fuel assembly, represented in vertically shortened form and being generally designated by reference numeral 10. The fuel assembly 10 is the type used in a pressurized water reactor (PWR), partially shown in simplified form and being generally designated by reference numeral 2, and has a structural skeleton which, at its lower end, includes a bottom nozzle 12 for supporting the fuel assembly 10 on a lower core support plate 14 in the core region of the nuclear reactor 2, a top nozzle 16 at its upper end, and a number of guide tubes or thimbles 18 which extend longitudinally between and are rigidly attached at opposite ends, to the bottom and top nozzles 12 and 16.

The fuel assembly 10 further includes a plurality of transverse grids 20 axially-spaced along and mounted to the guide thimble tubes 18 and, an organized array of elongated fuel rods 22 transversely-spaced and supported by the grids 20. The assembly 10 also has an instrumentation tube 24 located in the center thereof and extending between and mounted to the bottom and top nozzles 12 and 16. In view of the foregoing arrangement of parts, it will be understood that the fuel assembly 10 forms an integral unit capable of being conveniently handled without damaging the assembly parts.

As previously discussed, the array of fuel rods 22 in the fuel assembly 10 are held in spaced relationship with one another by the grids 20 which are spaced along the fuel assembly length. Each fuel rod 22 includes nuclear fuel pellets 26 and is closed at its opposite ends by upper and lower end plugs 28 and 30. The pellets 26 are maintained in a stack by a plenum spring 32 disposed between the upper end plug 28 and the top of the pellet stack. The fuel pellets 26, composed of fissile material, are responsible for creating the reactive power of the reactor. A liquid moderator/coolant such as water or water containing boron, is pumped upwardly through a plurality of flow openings in the lower core plate 14 to the fuel assembly. The bottom nozzle 12 of the fuel assembly 10 passes the coolant upwardly through the guide tubes 18 and along the fuel rods 22 of the assembly in order to extract heat generated therein for the production of useful work. To control the fission process, a number of control rods 34 are reciprocally moveable in the guide thimbles 18 located at predetermined positions in the fuel assembly 10. A spider assembly 39 positioned above the top nozzle 16 supports the control rods 34.

Figure 2B:
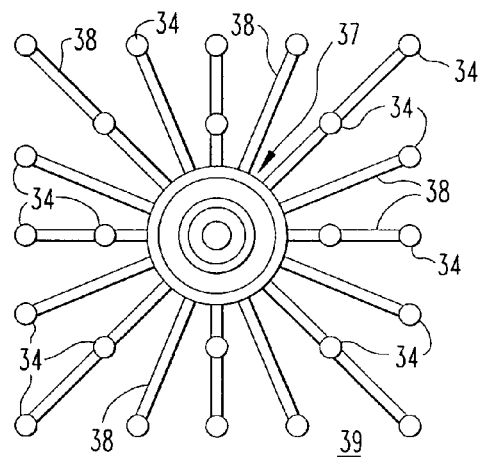
FIG. 2B is a top plan view of the control rod spider assembly for the control assembly of FIG. 2A.
Figure 2A:
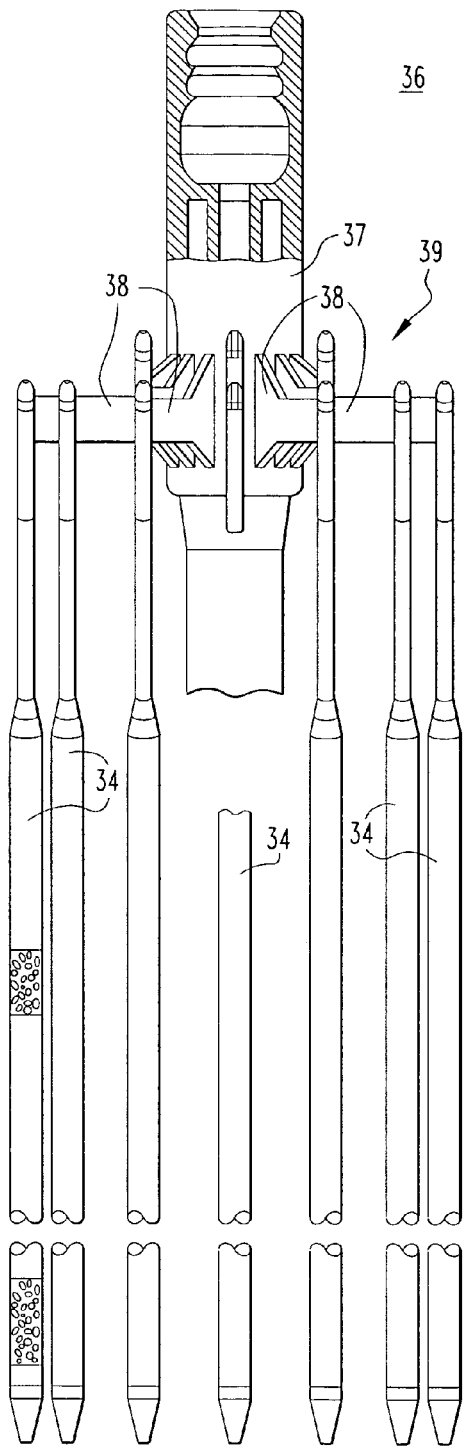
FIG. 2A is a partially sectioned elevational view of the control assembly of FIG. 1, which has been removed from the fuel assembly.

FIGS. 2A and 2B show the control rod assembly 36 after it has been removed from the fuel assembly 10 of FIG. 1. Generally, the control assembly 36 has an internally threaded cylindrical member 37 with a plurality of radially-extending flukes or arms 38, which comprise the spider assembly 39, best shown in FIG. 2B. As previously discussed, each arm 38 is interconnected to the control rods 34 such that the control rod assembly 36 is operable to move the control rods 34 vertically within the guide thimbles 18 (FIG. 1) to thereby control the fission process in the fuel assembly 10 (FIG. 1), all in a well known manner. With the exception of the exemplary control rod assembly which comprises an advanced gray control rod assembly (GRCA) 36 having improved gray rod assemblies 34, which will now be discussed, all of the foregoing is old and generally well known in the art.

Advanced GRCA

Continuing to refer to FIGS. 2A and 2B, the general control rod configuration will now be described. As previously stated, in order to take advantage of the MSHIM capabilities afforded by low worth or gray rods, known control rod assemblies, such as the existing control assemblies for the Westinghouse Electric Company LLC AP1000 reactor, employ GRCAs. However, while the GRCA design for the current AP1000 reactor design has 24 rods which are generally configured as shown in FIG. 2B, as mentioned hereinbefore, 20 of the 24 rods are stainless steel (e.g., without limitation, SS-304) water displacing rods and only four of the rods are neutron-absorber rods. Therefore, essentially all of the neutron-absorber material is localized and isolated in only four rod locations within the GRCA.

Additionally, in the existing AP1000 design, the absorber material comprises an Ag—In—Cd absorber consisting of about 85% silver, about 10% indium, and about 5% cadmium. This absorber material is consistent with known standard full-strength rod cluster control assemblies (RCCAs), in which all 24 rods are Ag—In—Cd. As noted, and as will be discussed herein with reference to FIG. 3, indium and cadmium are known to rapidly deplete. RCCAs spend a minimal amount of time in the core during power operation. Therefore, such depletion is not an issue. However, for the AP1000 mechanical shim (MSHIM) operation, for example, the GRCAs are expected to reside in the core for up to half of the operating cycle. Under these operating conditions, the existing GRCA design would need to be replaced about every five years due to rapid absorber depletion. As will be discussed in detail herein, among other benefits, the advanced GRCA design of the invention overcomes this rapid depletion disadvantage and also substantially avoids the undesirable local power spike experienced when traditional GRCA having four RCCA rods is pulled from the core.

Figure 3:
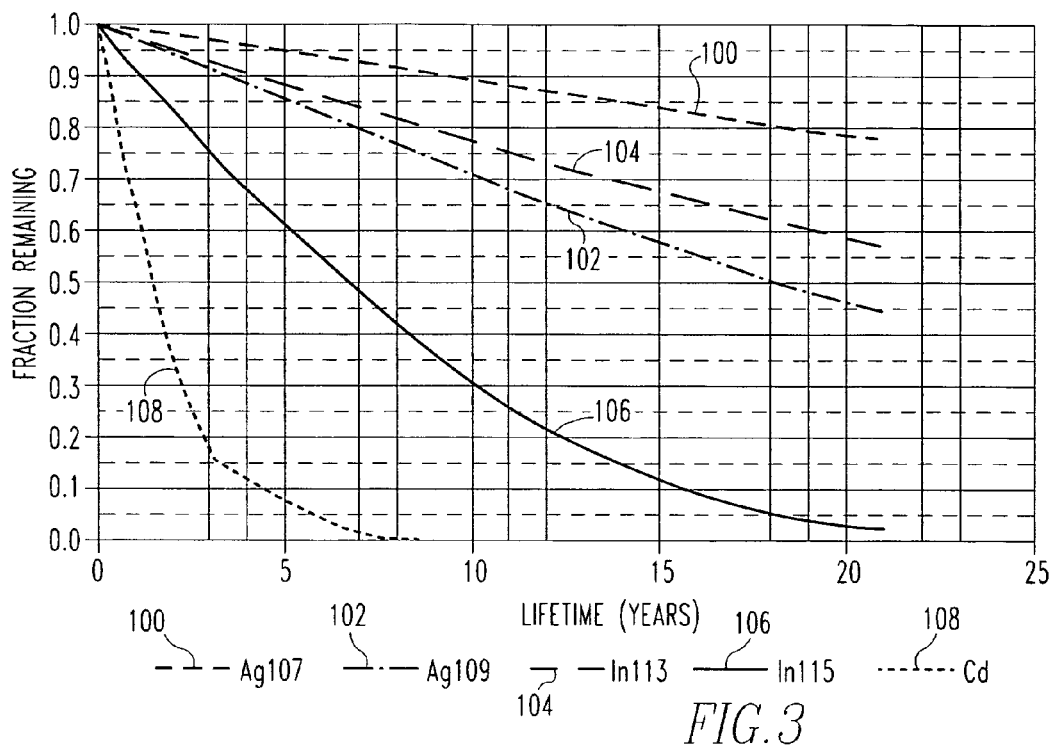
FIG. 3 is a graph plotting, for comparison, the rates of depletion for various neutron-absorber materials.

A further understanding of the aforementioned absorber depletion issue will be had with reference to FIG. 3. FIG. 3 shows a graph of the depletion rates for two different isotopes of silver, two different isotopes of indium, and the depletion rate for cadmium. More specifically, the depletions of silver-107 (Ag-107), silver-109 (Ag-109), indium-113 (In-113), indium-115 (In-115), and cadmium (Cd) are plotted together, for comparison, as lines 100, 102, 104, 106, and 108 respectively. As shown, both isotopes of silver 100, 102 have relatively slow linear depletion rates, whereas indium-115, 106 and cadmium 108 have rapid, non-linear depletion rates. Specifically, the rapid depletion of indium-115, 106 and cadmium 108 result in a loss of absorption strength of about 20% after only five years of operation. As noted hereinbefore, this undesirably results in reduced ability of the GRCAs to control the reactor during load follow, and ultimately leads to frequent GRCA replacement. The invention overcomes these disadvantages by employing an improved gray rod assembly design that, among other refinements, employs a different neutron-absorber material having an improved depletion in comparison with the existing Ag—In—Cd absorber.

Figure 4:
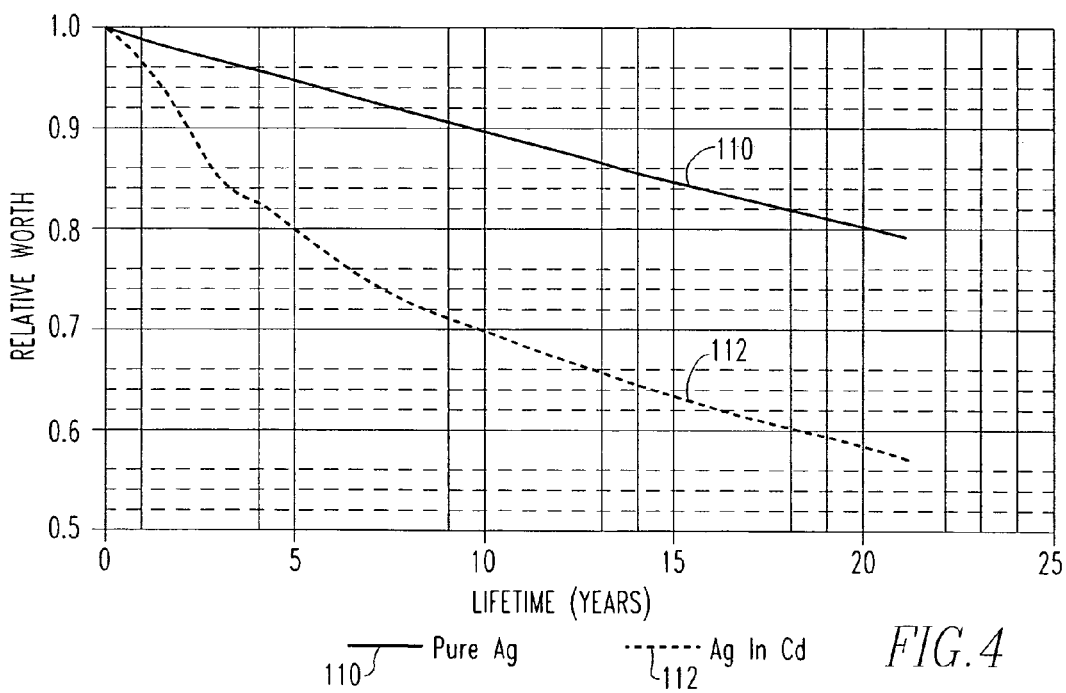
FIG. 4 is a graph plotting, for comparison, the depletion rate of a substantially pure silver absorber in accordance with the invention compared to the depletion rate of a prior art Ag—In—Cd absorber material.

Specifically, FIG. 4 shows a plot of the depletion rate of the exemplary absorber material 110 of the invention compared to the existing Ag—In—Cd absorber 1112. Like the graph of FIG. 3, the depletions are plotted by way of relative worth versus lifetime of the absorber 110, 112, in years. Specifically, the invention replaces the existing Ag—In—Cd absorber 112 with an absorber 110 that comprises substantially pure silver. As used herein, the phrases "substantially pure silver" and "pure silver" are used interchangeably to refer to an absorber that is almost entirely composed of the element silver, wherein any impurities that are present in the absorber are in such low quantities as to be generally negligible. As shown in FIG. 4, the use of pure silver significantly reduces the depletion rate of the absorber, extending the useful nuclear lifetime of the improved GRCA 36 (FIG. 2A) to between about 15-20 years, or between about 10-13 18-month cycles. Not only is this a dramatic improvement over the aforementioned useful lifetime of only about five years or three 18-month cycles for the existing Ag—In—Cd absorber, but the exemplary pure silver absorber 110 also advantageously depletes in a relatively gradual substantially linear fashion as opposed to the rapid exponential depletion of the Ag—In—Cd absorber 110. The extended useful life of the exemplary absorber 1112 allows the improved GRCA 36 (FIG. 2A) to meet demanding control rod lifetime requirements. For example, it enables the GRCA 36 to operate for extended periods of time in the reactor core, for up to about half of the operating cycle, or more.

In order to successfully adopt the exemplary pure silver absorber 110 of the invention, a number of obstacles had to be overcome. In fact, in view of certain traits of silver known to produce undesirable results when exposed to radiation, such as, for example, high fluence and associated silver swelling, use of a pure silver absorber is somewhat counter-intuitive to what is known and practiced in the art. More specifically, as previously discussed, because silver has a higher fluence (e.g., absorption capability) than cadmium and indium, it would be expected to produce the most swelling when inserted into the core and exposed to radiation, and, as also previously mentioned, such silver swelling produces an undesirable strain on the cladding until it eventually cracks. This can result in, among other problems, the contamination of the reactor coolant fluid. Accordingly, as will now be discussed, as another aspect of the advanced GRCA 36 of the invention, the gray rod assemblies 34 of the GRCA 36 were redesigned, and the disposition of the exemplary absorbers 110 within the assembly 36 was revised in order to address and resist the aforementioned undesirable characteristics of silver while simultaneously taking advantage of the benefits (e.g., improved depletion rate) it affords.

FIGS. 5 and 6 show the advanced gray rod assembly 34 of the invention. As shown in FIG. 5, the gray rod assembly 34 generally includes a first end 40 which, as oriented in the core (FIG. 1), is the bottom end, and a second end 42 (e.g., top end from the prospective of FIG. 1). The first or bottom end 40 has a tapered end plug 44. Such tapered design facilitates guided insertion of the rod 34 into the thimble tube 18 (FIG. 1) of the fuel assembly 10 (FIG. 1). The second or top end 42 has a top end plug 46 which is structured to engage and secure to the spider assembly 39 (best shown in FIG. 2A) in a known manner (e.g., without limitation, a complementary male/female threaded fastening arrangement). An elongated tubular member 48 extends between the top and bottom end plugs 46, 44. The exemplary tubular member is a stainless steel tube 48 made from 304-stainless steel, although tubes made from other known or suitable alternative materials are contemplated. In the example shown and discussed herein, the outer diameter 50 of the tube 48 is about 0.38 inches (0.97 centimeters) and the overall length 52 of the rod 34, from the top of the bottom end plug 44 to the bottom of the top end plug 46, is about 171.84 inches (436.49 centimeters). However, it will be appreciated that the concepts of the invention are equally applicable for rods having any suitable length and width for use in a wide variety of reactors.

The absorber material 110 (e.g., pure silver) is generally disposed within the lower half of the tube 48 in a manner such that the surface area of the absorber 110 is reduced in comparison with known absorbers, such as the Ag—In—Cd absorber discussed hereinbefore. Specifically, as best shown in the cross-sectional view of FIG. 6, the diameter 54 of the exemplary pure silver absorber 110 is substantially less than the outer diameter 50 of the rod tube 48, whereas the diameter of the existing Ag—In—Cd absorber (not shown) is relatively equivalent in diameter as the inside diameter (not labeled) of the rod tube 48. Such reduction in the absorber diameter 54 provides a substantial decrease in exposed surface area of the absorber 110. This is true despite any potential increase, if any, in the length 56 (FIG. 5) of the absorber (in comparison with the existing Ag—In—Cd absorber (not shown)), because the significant decrease in the diameter 54 of the absorber 110 outweighs any minimal increase in the length 56, as governed by the surface area relationship of $\Pi \times d \times L$, where d is the diameter 54 of the absorber 110 and L is the length 56 of the absorber 110. The length 56 of the absorber 110 in the example of FIG. 5 is about 166 inches (421.64 centimeters), although as with the other dimensions of the gray rod 34, this measurement could vary without departing from the scope of the invention. The reduced surface area of the absorber 110 of the invention serves as one means for resisting the adverse side affects (e.g., without limitation, silver-swelling and resultant thimble cracking) of silver when it is exposed to radiation.

A second measure for protecting, for example, against excessive silver-swelling, is the addition of a protective sheath or support tube 58 which generally encapsulates the absorber 110, as shown. Specifically, the support tube 58 has a relatively thick wall thickness 60 which is greater than the thickness of the wall of tube 48. Accordingly, the support tube 58 has an associated relatively high strength capable of resisting outward expansion of the absorber 110 and resisting resultant strain on the cladding. Conversely, the exemplary support tube 58 provides a compressive inward force on, or contains the absorber 110 thereby resisting swelling thereof. The exemplary support tube 58 is made from stainless steel, such as 304 stainless steel, although any other know or suitable material could be employed. In view of the foregoing, the exemplary absorber 110 and gray rod assemblies 34 provide both a mechanical advantage, through the added strength of the exemplary support tube 58, and the additional nuclear advantage of minimizing the surface area of absorber 110 and thus amount of silver exposed to radiation, which results in less heat being produced for a particular power level. This in turn resists bulk boiling (as will be discussed).

Accordingly, the exemplary gray rod assemblies 34 of the invention provide an extended nuclear lifetime through use of the substantially pure silver absorber 110. In addition to the aforementioned resistance to bulk boiling during conditions of high local power density, and to absorber swelling and resultant clad cracking, the overall GRCA design 36 of the invention also generally improves linear heat rate margins during rod maneuvers. Specifically, the exemplary GRCA distributes the absorber 110 over all 24 rods 34 of the control assembly 36 as opposed to localizing the absorber in only four rods, as in the existing AP1000 design discussed hereinbefore. Distributing the absorber 110 among all of the GRCA rods 34 reduces the change in local fuel rod power (delta-power) when the GRCA 36 is removed from the core, which in turn improves operating margins. Specifically, distributing the absorber material 110 over all 24 rods reduces the mount of absorber 110 in each rod 34, which reduces the amount of heat generated in each rod 34 and resists the risk of bulk boiling in the thimbles 18 under high local power density conditions. The exact amount of the reduction in amount of absorber material 110, as compared with the four Ag—In—Cd absorbers of the current design, is not meant to be limiting upon the invention.

In view of the foregoing, the exemplary gray rod assemblies 34 have been redesigned to include a combination of improved features such as support tube 58, an entirely different absorber material 110 comprising substantially pure silver, a significantly smaller diameter (e.g., diameter 54) and the reduced amount of absorber 110, and distribution of the absorber 110 among all of the rods 34. Accordingly, the GRCA 36 of the invention addresses and substantially overcomes the aforementioned disadvantages known in the art by reducing the amount of neutron-absorber material 110 per rod 34, and by substantially evenly distributing the absorber material 110 among all of the gray rods 34 of the assembly 36. The advantages of the exemplary advanced GRCA design 36 will be further understood and appreciated with reference to FIGS. 7 and 8.

Figure 7:
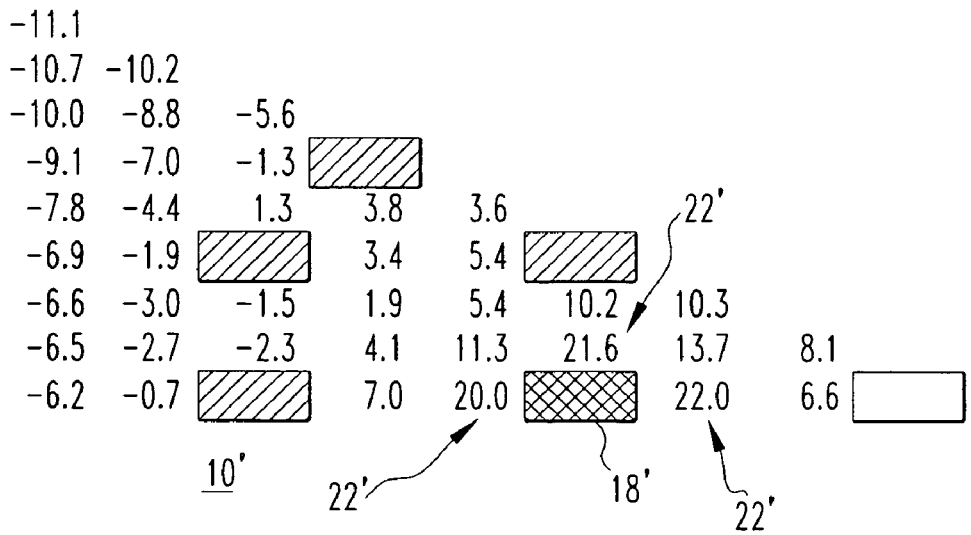
FIG. 7 is a schematic diagram of one-eighth of a prior art fuel assembly, showing the change in rod power after the prior art GRCA has been removed from the core during a rod pull.
Figure 8:
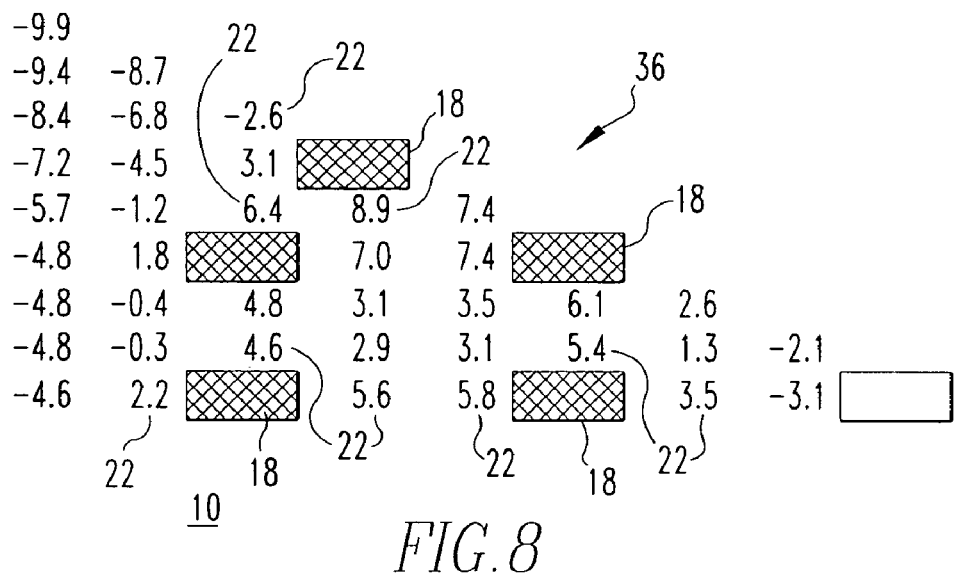
FIG. 8 is a schematic diagram of one-eighth of a fuel assembly showing the change in rod power of the fuel assembly, which employs the advanced GRCA of the invention, shown after the GRCA has been removed from the core.

FIG. 7 is a schematic or simplified view of one-eighth of a conventional fuel assembly 10' which shows, for purposes of comparison with the exemplary design of FIG. 8, the relatively large increase in local power experienced by the fuel rods 22' surrounding the thimble 18' that previously contained the absorber rods (not shown in FIG. 7), when the conventional GRCA (not shown) is withdrawn from the fuel assembly 10'. The numbers shown in FIG. 7 represent the percent change in rod power in response to the GRCA being pulled from the fuel assembly 10'. The adverse effects of the known, localized absorber are shown. Specifically, as shown, the fuel rods 22' adjacent the thimble 18' that housed the Ag—In—Cd absorber experience an isolated or localized spike in power change. As previously discussed, such a dramatic change in power is undesirable as it produces excessive heat and thus bulk boiling, and swelling and clad cracking problems.

FIG. 8 confirms that the GRCA design 36 (FIG. 2) of the invention overcomes these problems. Specifically, comparing FIG. 8 with FIG. 7, the same one-eighth section of the fuel assembly 10 is shown following a rod pull operation wherein the exemplary GRCA 36 (FIG. 2) and gray rods 34 (FIGS. 2, 5 and 6) have been pulled from the fuel assembly 10. As shown, the change in rod power surrounding the thimbles 18 that housed the absorber rods (not shown in FIG. 8) is substantially reduced in comparison with the values of the example of FIG. 7. Specifically, as shown in the example of FIG. 8, the greatest percent change in rod power for the GRCA 36 of the invention is about 8.9%. This is a significant improvement over the percent change in rod power of about 22% for the conventional GRCA design depicted in FIG. 7. As discussed hereinbefore this improvement is, in large part, attributable to the exemplary distribution of the absorber rods 34 (not shown in FIG. 8) among all 24 thimble locations 18, as opposed to only four thimble locations 18' total. For example, there is only one absorber location 18' shown in the one-eighth portion of the fuel assembly 10' of FIG. 7 whereas the absorber locations 18 are shown in the exemplary design of FIG. 8. In summary, the combination of the substantially pure silver absorber 110, the reduced absorber size per rod 34, the absorber shield or support tube 58, and the distribution of the absorber 110 throughout all of the rods 34 of the GRCA 36 of the invention, result in reducing the neutron absorption capability of each rod 34 of the GRCA 36 by about one-sixth, which thereby reduces the change in local rod power (delta-power) when, for example, the GRCA 36 is pulled from the assembly 10. It will be appreciated that the advanced features of the GRCA 36 of the invention may be employed individually or in any known or suitable combination. For example, without limitation, an alternative absorber material other than the exemplary substantially pure silver absorber 10 discussed herein, could be employed in the exemplary reduced size, distributed configuration of the invention, without departing from the scope of the invention.

Accordingly, the invention provides an advanced GRCA 36 that, among other benefits, exhibits an approved depletion rate and resistance to bulk boiling, and to silver swelling and clad cracking.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A gray rod assembly for a rod control assembly of a nuclear reactor, said nuclear reactor including a number of fuel assemblies each having a plurality of elongated nuclear fuel rods supported in an organized array by a number of substantially transverse support grids, and a plurality of guide thimbles disposed through said support grids and along said fuel rods, said rod control assembly including a spider assembly having a plurality of radially extending flukes and being structured to move each gray rod assembly within one of said guide thimbles in order to control the rate of power produced by said nuclear reactor, said gray rod assembly comprising:

an elongated tubular member having a first end, a second end, an outer diameter, a length, and a wall thickness;

a first end plug coupled to the first end of said elongated tubular member, and being structured to facilitate insertion of said elongated tubular member into one of said guide thimbles of said fuel assembly;

a second end plug coupled to the second end of said elongated tubular member, and being structured to be coupled to one of said radially extending flukes of said spider assembly of said rod control assembly;

only one single solid neutron-absorber element disposed within said elongated tubular member generally toward the first end thereof, said neutron absorber element having a diameter which is substantially less than the diameter of said elongated tubular member, and a length which is shorter than the length of the elongated tubular member, in order to minimize the exposed surface area of said neutron-absorber element to radiation when said tubular member is inserted into said thimble; and only one single support tube structured to surround said neutron-absorber element within said elongated tubular member, said neutron-absorber element centrally disposed within said support tube, said support tube having a wall thickness and being disposed between said neutron-absorber element and said elongated tubular member, and being structured to resist swelling of said neutron-absorber element, wherein said wall thickness of said support tube is greater than said wall thickness of said elongated tubular member, and wherein said support tube comprises a single continuous piece of material.

2. The gray rod assembly of claim 1 wherein said neutron-absorber element comprises a substantially pure silver absorber material.

3. The gray rod assembly of claim 1 wherein said neutron-absorber element is substantially concentrically disposed within said elongated tubular member; and wherein said support tube has a wall thickness which is substantially defined by the space between the outer diameter of said absorber element and the inner diameter of said elongated tubular member.

4. The gray rod assembly of claim 3 wherein said support tube is made from stainless steel.

5. The gray rod assembly of claim 3 wherein said neutron-absorber element is substantially pure silver; and wherein said support tube encapsulates said substantially pure silver absorber element in order to resist silver-swelling thereof.

6. An advanced gray rod control assembly for a nuclear reactor, said nuclear reactor including a plurality of fuel assemblies each having a plurality of elongated nuclear fuel rods supported in an organized array by a number of substantially transverse support grids, and a plurality of guide thimbles disposed through said support grids and along said fuel rods, said advanced gray rod control assembly comprising:
 a spider assembly having a plurality of radially extending flukes; and
 a plurality of gray rod assemblies coupled to said flukes of said spider assembly, said spider assembly being structured to move each gray rod assembly within one of said guide thimble in order to control the rate of power produced by said nuclear reactor, wherein each of said gray rod assemblies comprises:
  an elongated tubular member having a first end, a second end, an outer diameter, a length, and a wall thickness,
  a first end plug coupled to the first end of said elongated tubular member, and being structured to facilitate insertion of said elongated tubular member into one of said guide thimbles of said fuel assembly,
  a second end plug coupled to the second end of said elongated tubular member, and being structured to be coupled to one of said radially extending flukes of said spider assembly,
  only one single solid neutron-absorber element disposed within said elongated tubular member generally toward the first end thereof, said neutron absorber element having a diameter which is substantially less than the diameter of said elongated tubular member, and a length which is substantially shorter than the length of the elongated tubular member, and
  only one single support tube surrounding said neutron-absorber element within said elongated tubular member in order to resist swelling of said neutron-absorber element and the cracking of said elongated tubular member when said rod assembly is inserted into said thimble, said neutron-absorber element centrally disposed within said support tube, said support tube having a wall thickness,
  wherein said wall thickness of said support tube is greater than said wall thickness of said elongated tubular member, and
  wherein said support tube comprises a single continuous piece of material.

7. The advanced gray rod control assembly of claim 6 wherein said neutron-absorber element is distributed among all of said gray rod assemblies of said plurality of gray rod assemblies.

8. The advanced gray rod control assembly of claim 7 wherein said plurality of gray rod assemblies comprises 24 gray rods; and wherein said neutron-absorber element is distributed generally equally among all 24 gray rods of said assembly.

9. The advanced gray rod control assembly of claim 6 wherein said neutron-absorber element comprises a substantially pure silver absorber material.

10. The advanced gray rod control assembly of claim 6 wherein said neutron-absorber element is substantially concentrically disposed within said elongated tubular member; and wherein said support tube has a wall thickness which is substantially defined by the space between the outer diameter of said absorber element and the inner diameter of said elongated tubular member.

11. The advanced gray rod control assembly of claim 10 wherein said support tube is made from stainless steel.

12. The advanced gray rod control assembly of claim 10 wherein said neutron-absorber element is substantially pure silver; and wherein said support tube encapsulates said substantially pure silver absorber element in order to resist silver-swelling thereof.

13. A nuclear reactor comprising:
 a plurality of elongated nuclear fuel rods each having an extended axial length;
 a number of substantially transverse support grids space along the axial length of said fuel rods in order to hold said fuel rods in an organized array;
 a plurality of guide thimbles disposed through said support grids and along said fuel rods; and
 an advanced gray rod control assembly including a spider assembly having a plurality of radially extending flukes, and a plurality of gray rods assemblies coupled to said flukes, said advanced gray rod control assembly being structured to move each of said gray rod assemblies within one of said guide thimble in order to control the rate of power produced by said nuclear reactor, wherein each of said gray rod assemblies comprises:
  an elongated tubular member having a first end, a second end, an outer diameter, a length, and a wall thickness,
  a first end plug coupled to the first end of said elongated tubular member, said first end plug being tapered in order to facilitate insertion of said elongated tubular member into one of said guide thimbles of said fuel assembly,
  a second end plug coupled at one end to the second end of said elongated tubular member, and at the other end to one of said radially extending flukes of said spider assembly,
  only one single solid neutron-absorber element disposed within said elongated tubular member generally toward the first end thereof, said neutron absorber element having a diameter which is substantially less than the diameter of said elongated tubular member, and a length which is substantially shorter than the length of the elongated tubular member,
  only one single support tube disposed between said neutron-absorber element and said elongated tubular member thereby encapsulating said neutron-absorber element within said tubular member, in order to resist swelling of said absorber element, said neutron-absorber element centrally disposed within said support tube,
  wherein said wall thickness of said support tube is greater than said wall thickness of said elongated tubular member, and
  wherein said support tube comprises a single continuous piece of material.

14. The nuclear reactor of claim 13 wherein said neutron-absorber element is distributed among all of said gray rod assemblies of said gray rod control assembly.

15. The nuclear reactor of claim 14 wherein said plurality of gray rod assemblies comprises 24 gray rod assemblies; and wherein said neutron-absorber element is distributed generally equally among all 24 gray rod assemblies of said gray rod control assembly.

16. The nuclear reactor of claim 13 wherein said neutron-absorber element comprises a substantially pure silver absorber material.

17. The nuclear reactor of claim 13 wherein said neutron-absorber element is substantially concentrically disposed within said elongated tubular member; and wherein said support tube has a wall thickness which is substantially defined by the space between the outer diameter of said absorber element and the inner diameter of said elongated tubular member.

18. The nuclear reactor of claim 17 wherein said support tube is made from stainless steel.

19. The nuclear reactor of claim 17 wherein said neutron-absorber element is a substantially pure silver absorber; and wherein said support tube encapsulates said absorber element in order to resist silver-swelling thereof.

* * * * *